(12) United States Patent
Patron

(10) Patent No.: US 9,884,999 B2
(45) Date of Patent: Feb. 6, 2018

(54) PROCESS WITH IMPROVED PRODUCTIVITY FOR THE CONVERSION OF HEAVY OILS

(71) Applicant: Luigi Patron, Milan (IT)

(72) Inventor: Luigi Patron, Milan (IT)

(*) Notice: Subject to any disclaimer, the term of this patent is extended or adjusted under 35 U.S.C. 154(b) by 0 days.

(21) Appl. No.: 14/762,977

(22) PCT Filed: Jan. 24, 2014

(86) PCT No.: PCT/IT2014/000023
§ 371 (c)(1),
(2) Date: Jul. 23, 2015

(87) PCT Pub. No.: WO2014/118814
PCT Pub. Date: Aug. 7, 2014

(65) Prior Publication Data
US 2015/0353848 A1 Dec. 10, 2015

(30) Foreign Application Priority Data
Jan. 30, 2013 (IT) .............................. MI2013A0131

(51) Int. Cl.
*C10G 67/14* (2006.01)
*B01D 3/00* (2006.01)
(Continued)

(52) U.S. Cl.
CPC ............. *C10G 67/14* (2013.01); *B01D 3/009* (2013.01); *B01D 3/10* (2013.01); *B01D 19/00* (2013.01);
(Continued)

(58) Field of Classification Search
CPC .............................. C10G 47/24; C10G 67/14; C10G 2300/1077; C10G 2300/4081;
(Continued)

(56) References Cited

U.S. PATENT DOCUMENTS

| | | | |
|---|---|---|---|
| 3,681,231 A | 8/1972 | Alpert et al. | |
| 3,817,856 A * | 6/1974 | Aaron et al. ........... | C10G 45/16 208/157 |

(Continued)

FOREIGN PATENT DOCUMENTS

| | | |
|---|---|---|
| EP | 0 732 389 A2 | 9/1996 |
| GB | 2 108 525 A | 5/1983 |

(Continued)

OTHER PUBLICATIONS

International Search Report, dated Jan. 9, 2015, from corresponding PCT Application.

*Primary Examiner* — Prem C Singh
*Assistant Examiner* — Brandi M Doyle
(74) *Attorney, Agent, or Firm* — Young & Thompson

(57) ABSTRACT

Process for the complete conversion of heavy oils into distillates, such as the vacuum residues of heavy crude oils, characterized by the simultaneous use of two separate modes of extraction of the conversion products. Alongside the current mode of recovery of the conversion products, based on the treatment of the effluent of the top zone of the reaction, a second mode is added, based on the direct extraction of liquid from the reaction zone, degassing such liquid at the same pressure as the reactor and subjecting it to vacuum extraction. The vacuum residue is recycled in the reaction. The double mode of extraction allows greatly increasing the capacity of the reactor.

16 Claims, 3 Drawing Sheets

(51) Int. Cl.
    *B01D 19/00*     (2006.01)
    *B01D 3/10*     (2006.01)
    *C10G 47/24*     (2006.01)

(52) U.S. Cl.
    CPC ......... B01D 19/0042 (2013.01); C10G 47/24 (2013.01); *C10G 2300/1077* (2013.01); *C10G 2300/4081* (2013.01); *C10G 2400/06* (2013.01); *C10G 2400/08* (2013.01); *C10G 2400/10* (2013.01); *C10G 2400/16* (2013.01)

(58) Field of Classification Search
    CPC ............ C10G 2400/06; C10G 2400/08; C10G 2400/10; C10G 2400/16; B01D 19/00; B01D 19/0042; B01D 3/009; B01D 3/10
    See application file for complete search history.

(56) References Cited

U.S. PATENT DOCUMENTS

| | | |
|---|---|---|
| 4,214,977 A | 7/1980 | Ranganathan et al. |
| 2002/0125172 A1* | 9/2002 | Que .................. C10G 65/12 208/108 |
| 2007/0138056 A1 | 6/2007 | Farshid et al. |
| 2007/0140927 A1 | 6/2007 | Reynolds et al. |

FOREIGN PATENT DOCUMENTS

| | | |
|---|---|---|
| WO | 97/34967 A1 | 9/1997 |
| WO | 01/98436 A1 | 12/2001 |

\* cited by examiner

US 9,884,999 B2

PROCESS WITH IMPROVED PRODUCTIVITY FOR THE CONVERSION OF HEAVY OILS

FIELD OF APPLICATION OF THE INVENTION

The present invention relates to a process with improved productivity for the complete conversion into distillates of heavy oils, such as atmospheric residues and the heavy residues deriving from the vacuum distillation of heavy crude oils. More precisely, the present invention refers to a process actuated in an upflow reactor such as of bubble column type.

REVIEW OF THE PRIOR ART

The development on industrial scale of the processes for the complete conversion of heavy oils into distillable products, free of carbon residue, has up to now encountered various obstacles that are mainly due to the low productivity of the reactors, together with the difficulty of controlling the formation of coke. The logic followed has been mainly based on making the reaction conditions more severe. In consideration of the low volatility of the conversion products (very high boiling points, up to 500°-520° C.), operating conditions have been sought such to bring the reaction temperature close to the boiling temperature of the products, in order to improve the extractability thereof through the gaseous effluent exiting from the top zone of the reactor. The increase of the reaction temperature, however, also accelerates the formation of asphaltene resins, and with these the undesired formation of coke; in order to reduce such coke, solid catalysts are added, at the level of several percent by weight in relation to the weight of the treated liquid charge stock. The use of solids, however, makes it impractical to recycle the unconverted residue during reaction; consequently, a single passage is carried out of the charge stock during reaction, with the reactor in "once through" mode, such as in the U.S. Pat. No. 4,214,977 in which for attaining high productivities, very severe conditions are employed along with high temperatures and strong doses of solid catalyst, containing ferrous sulfate, in order to limit the formation of coke. Nevertheless, very severe processes do not resolve the problem tied to the non-negligible quantities of unconverted residue, which is hard and costly to dispose of. Even conversions reaching 80-90% but still incomplete lead to the problem of the destination of the unconverted residue—a problem which appears simple on the surface but is in fact not at all so. In order to obtain the complete conversion of a heavy charge stock, it is necessary to be able to recycle the residue unconverted during the reaction. The increase of the productivity of the hydroconversion process, i.e. of the process with use of hydrogen, obtained thermally, prevents the complete conversion of the charge stock and results problematic for the accompanying production of high percentages of solid residues.

The subject of the complete conversion of heavy oils was also confronted from the reactor standpoint. For example, in the patent application U.S. 2007/0140927 A1 a reactor is described with liquid circulation, produced by an internal conveyor, which allows operating with higher flow rates of gas in order to improve the capacity thereof. The single point of extraction of the conversion products is positioned on the top of the reactor, where the reaction effluent exits outward. The same reactor with liquid circulation is used in the patent application U.S. 2007/0138056 A1, in a scheme with multiple reactors. Also in this structure, the reaction products are exclusively recovered by the effluent exiting from the top of each of the reactors. The extraction of the reaction products attained by only treating the effluent coming from the top zone of the reactor is a factor that considerably limits the capacity of the reactors.

OBJECTS OF THE INVENTION

The object of the present invention is therefore to remedy the aforesaid drawbacks and to indicate a process of hydroconversion of heavy oils, in which a different mode of extraction of the reaction products leads to overcoming the aforesaid limits, and allows greatly increasing the output of the reactors without having to make the reaction conditions more severe.

SUMMARY OF THE INVENTION

The subject of the present invention is a high-output process for the complete conversion of a heavy liquid charge stock, in an upflow reactor such as of bubble column type in normal temperature and operating pressure conditions, characterized by the simultaneous use of two separate modes of extraction of the conversion products.

Alongside the current mode of recovery of the conversion products, based on the treatment of only the gaseous effluent that exits outward from the top of the reactor, a second recovery mode is added that allows obtaining an additional flow of conversion products by drawing reaction liquid directly from the liquid phase of the reactor, degassing such liquid at the same pressure as the reactor and subjecting the same liquid to a process of extraction via vacuum distillation. The residue of such distillation is recycled during reaction. The double mode of extraction allows greatly increasing the capacity of extraction of the conversion products and, consequently, the capacity of the reactor.

BRIEF DESCRIPTION OF THE FIGURES

Further objects and advantages of the present invention will be clearer from the following detailed description of an embodiment thereof and from the enclosed drawings, given as a merely non-limiting example, in which.

In the following description, a figure can also be illustrated with reference to elements not expressly indicated in that figure but in other figures. The scale and proportions of the various depicted elements do not necessarily correspond to the actual scale and proportions.

DETAILED DESCRIPTION OF SEVERAL PREFERRED EMBODIMENTS OF THE INVENTION

Figure 1:
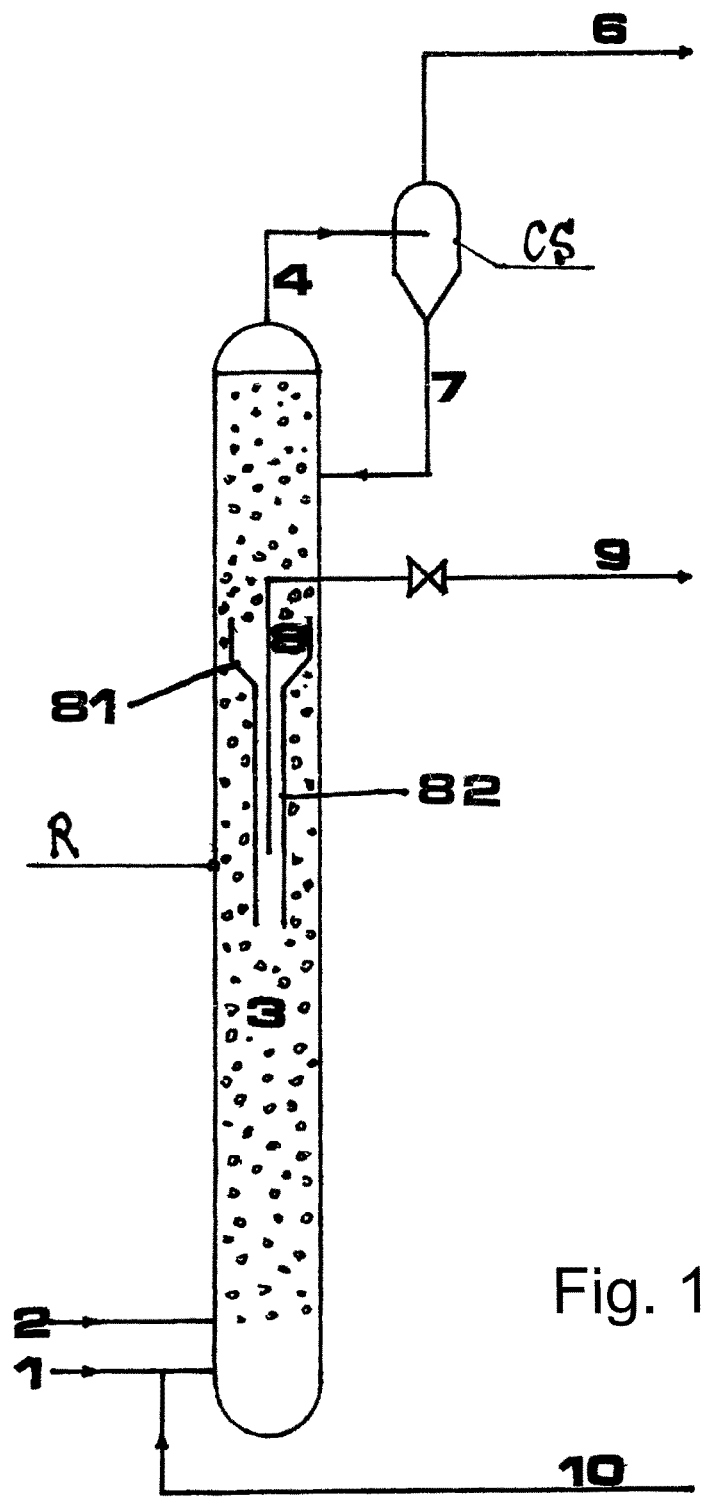
FIG. 1 shows a plant for actuating the process according to the invention.

With reference to FIG. 1, a first embodiment of the invention is illustrated.

The treatment of the heavy liquid charge stock with hydrogen is the central step of the conversion process. The hydrogen is fed to the reactor with great excess with respect to the hydrogen consumed during the reaction. The hydrogen, or the gas containing hydrogen, is intentionally fed in excess in order to facilitate the extraction of the conversion products through the gaseous effluent exiting from the top of the reactor. The gaseous effluent is constituted by hydrogen, conversion products at the gaseous state and at the vapor state and by carryover of reaction liquid containing the conversion products with higher boiling point. The effluent, which with regard to its composition can be qualified as two-phase, is the vehicle that conveys the liquid reaction products outside the reactor, towards the high-pressure separator. For a preset temperature and for a specific section on the horizontal plane of the reactor, the liquid transport capacity increases with the spatial velocity of the gas, which nevertheless cannot be increased beyond specific limits. The spatial velocity of the gas is a characteristic parameter of the process constituted by the ratio between the flow rate of gas fed to the reactor ($m^3/h$), measured at the reaction pressure, and the measure of the horizontal section of the reactor ($m^2$).

Consequently, the flow of reaction liquid conveyed by the gas to the separator is necessarily of limited size, insufficient for ensuring a suitable extraction of the liquid conversion products, in particular in the large-size industrial reactors. An insufficient extraction involves the accumulation of conversion products to the reactor, which take away reaction volume for the charge stock to be treated, actually limiting the capacity of the reactor itself. In addition, the liquid conversion products that are accumulated, as a consequence of their chemical nature with low aromatic percentage, induce the precipitation of the asphaltenes, rendering the reaction mixture unstable and thus hard to process. For these grounds, the current mode of extraction of the conversion products, based on the treatment of only the gaseous effluent exiting from the top of the reactor, results inadequate.

In the process according to the invention, alongside the flow of products present in the gaseous effluent that exits from the vault of the reactor, the Applicant places a second and additional flow of products, obtained by drawing reaction liquid directly from the liquid phase of the reactor, degassing such liquid at the same pressure as the reactor and subjecting the same liquid to distillation, with final vacuum stage, for the recovery of the conversion products with higher boiling point. The residue of the distillation is recirculated in the reaction in order to complete the conversion.

In FIG. 1, such solution is represented.

The charge stock to be treated (1) and the hydrogen, i.e. the gas (2) containing hydrogen, are fed to the base of the upflow reactor which in the described case is a bubble column (R) in which the flow of hydrogen ensures the remixing and thus homogeneity of the reaction means, i.e. of the bubbling-liquid phase (3). The reaction between the liquid charge stock 1 and the hydrogen 2 is preferably conducted at an operating temperature comprised between 380 and 440° C., and at a pressure comprised between 10 and 20 Mpa. The two-phase flow (4) exiting from the top zone of the reactor is sent to the cyclone-separator (CS), positioned above the reactor, at the head of which the conversion products in vapor phase (6) are obtained, while the separated liquid phase (7) is made to flow back via gravity to any height of the reactor so long as it is below the liquid/vapor interface which is found in proximity to the base of the upper hemispherical cap of the reactor. The reaction liquid which contains the second and additional flow of products is extracted in degassed form directly from the bubbling-liquid phase (3) of the reactor through the degasser-extractor (8) comprising a frustoconical conveyor (81) and relative descending section (82) from which the reaction liquid is derived. Preferably, the extraction line (9) removes the reaction liquid from the interior of the descending section by means of a tube that crosses from the top to the bottom of the conveyor. The liquid in traversing the frustoconical conveyor from the top towards the bottom frees the gas which, moving in the opposite direction, ascends up to the top of the reactor. The correct sizing of the extractor (8) ensures the necessary efficiency of the degassing. With reference to the aforesaid degasser-extractor (8), it is observed that the flow rate of degassed extracted liquid coincides, or is slightly less than the flow rate of liquid that traverses the descending section, with bottom always open, without therefore inducing a circulation of liquid inside the reactor (R). On the basis of the liquid flow rate provided in the descending section, extracted from the line (9), the upper diameter of the frustoconical conveyor is sized for the purpose of controlling the descent velocity of said flow rate. For pressures at the reactor comprised between 10 and 20 MPa, the liquid flow rate at the descending section, and hence the maximum extractable flow rate, is limited within 50 t/h, preferably within 23 t/h, per square meter of extractor inlet section. Consequently, for high flow rates of extraction, one operates with a reactor with 2 or more extractors. The degassed reaction liquid drawn at the degasser-extractor (8) by means of the line (9) is sent to the low pressure section, not shown in the figures, where the recovery of the products occurs by means of vacuum distillation. The residue of the distillation constitutes the recycling (10) which returns to the reaction for the completion of the conversion.

Alternatively to that described above, FIG. 2 illustrates a plant for the development of the process according to the invention in a preferred variant embodiment.

According to such figure, the extraction of reaction liquid is carried out by drawing, from the bubbling-liquid phase (3) of the upflow reactor, a mixture of reaction liquid+gas and degassing such mixture in the tank (S) with double inlet situated outside the reactor, such tank maintained at the pressure of the reactor and positioned at the lower part of the reactor, possibly on the ground. The tank (S) substitutes the high pressure separator (CS) of FIG. 1. The tank (S) performs the double function of separator and degasser. In the upper part (5), fed with the two-phase flow (4) coming from the top of the reactor (R), the separation occurs of the gaseous fraction from the liquid fraction. The latter falls back into the lower part (7) of the tank.

The gaseous phase (61) is liberated from the top of the tank (S), such phase constituted by hydrogen and by the conversion products in gas phase and in vapor phase.

Still with reference to the tank (S), the lower zone thereof performs the function of degasser also of the reaction liquid+gas mixture directly drawn from the bubbling zone of the reactor by means of the line (11). The degassed reaction liquid is extracted from the line (12) and sent to the low pressure section, not shown in the figure, in order to carry out the recovery of the high-boiling conversion products by means of vacuum distillation. The residue of the vacuum distillation (10) is recycled at the base of the reactor, where the fresh charge stock (1) and the hydrogen or the gas containing hydrogen (2) also enter. In order to ensure the necessary efficiency of the degassing, in particular operating at high flow rates of extraction of reaction liquid+gas mixture, it is necessary to adjust the flow rate of extraction (12) to the horizontal section of the tank (S) or vice versa. For pressures at the reactor, and hence at the separator, comprised between 10 and 20 MPa, the flow rate of extraction (12) is limited within 50 t/h, preferably within 23 t/h, per square meter of section on the horizontal plane of the tank (S). Alternatively, and with reference to FIG. 3, the two-phase flow 4 coming from the top of the reactor continues to be fed to the high pressure separator CS. The degassed liquid collected at the bottom of said separator is then made to flow back into the reactor R, by means of the line 7, below the liquid/vapor interface present in the upper zone of the reactor. The line (11) draws, from the bubbling-liquid phase (3) of the reactor, a reaction liquid+gas mixture which is degassed in the tank S. On the bottom of said tank, the degassed reaction liquid is collected, which is sent by means of the line 13 to the vacuum distillation section for the recovery of the high-boiling point products.

The gaseous fraction, freed from the degassed liquid in the upper zone of the tank S, containing hydrogen and the conversion products in vapor phase, is made to flow by means of the line 62 into the line 6 which collects the gases coming from the cyclone separator CS. The residue of the vacuum distillation (10) is recycled at the base of the reactor, where the fresh charge stock (1) and the hydrogen or the gas containing hydrogen (2) also enter.

In a further variant embodiment, not illustrated, the man skilled in the art by suitably modifying the characteristics of the plant in accordance with his knowledge, could make the degassed liquid collected at the bottom of the separator CS flow into the same extraction line that conveys the degassed liquid collected at the bottom of the separator S in order to send said liquids to the vacuum distillation section for the recovery of the high-boiling point products.

Figure 2:
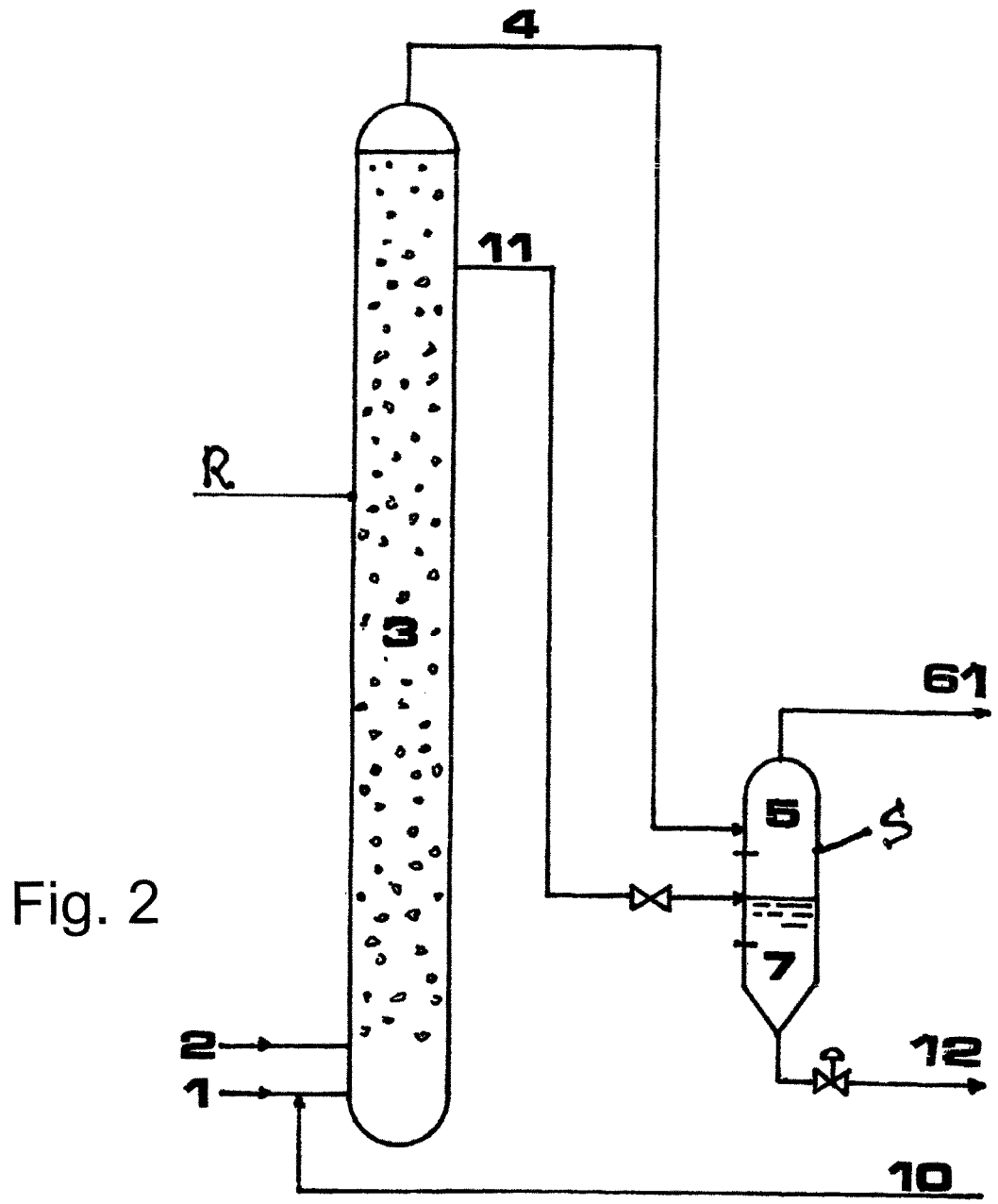
FIG. 2 shows a preferred and an alternative embodiment of the plant for actuating the process according to the invention.
Figure 3:
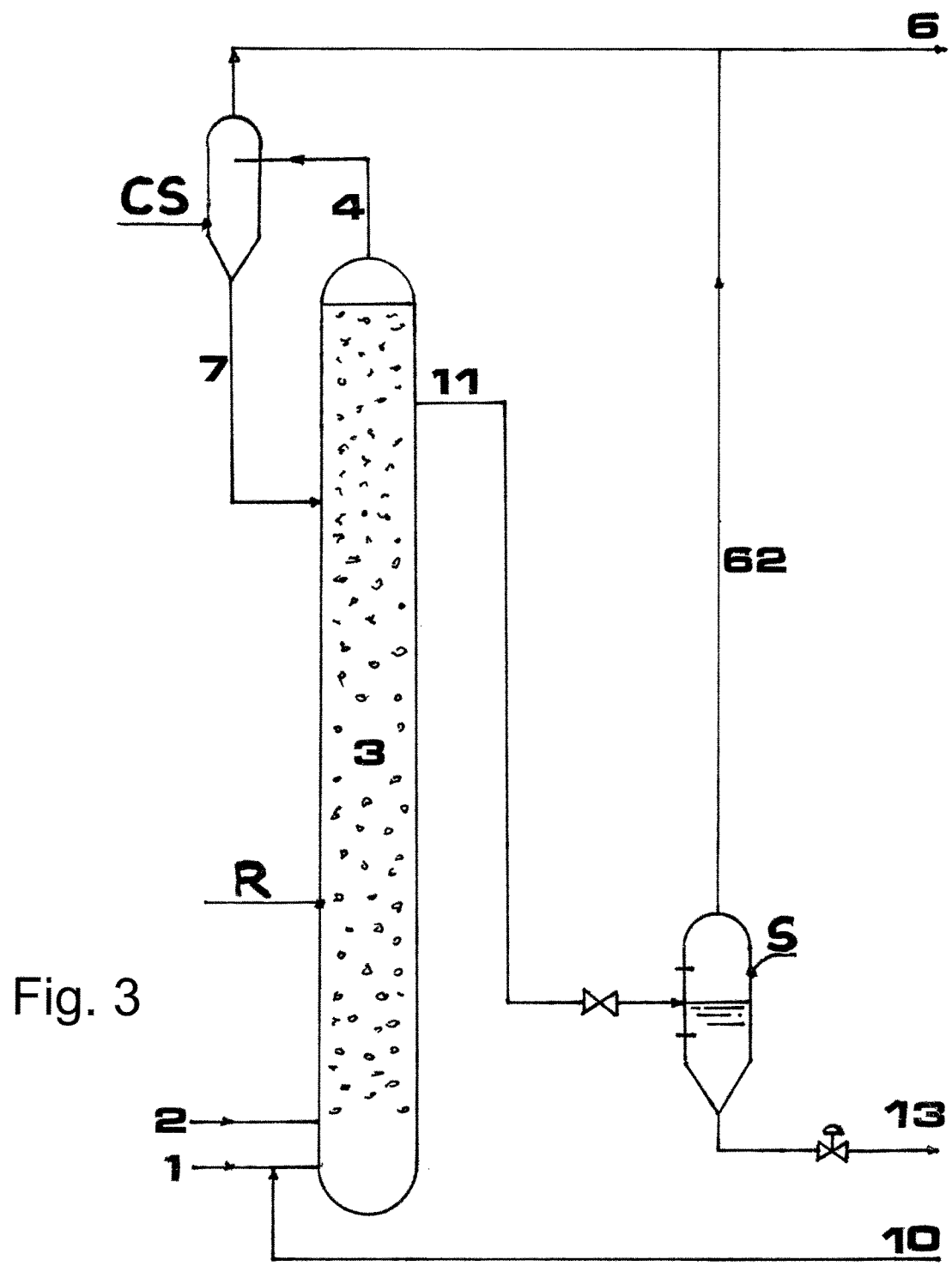
FIG. 3 shows a further alternative embodiment of the plant for actuating the process according to the invention.

The process represented in FIG. 1 and the variants with external degasser represented in FIGS. 2 and 3, as a consequence of the double mode of extraction of the conversion products, supply—regardless of the reaction conditions employed and the type of catalyst—an additional output with respect to that obtainable by processing only the two-phase effluent coming from the top of the reactor. The extraction, from the bubbling-liquid phase, of a flow rate of reaction liquid not less than 0.5 times the flow rate of incoming liquid charge stock allows obtaining a considerable increase of the output of the reactor. By extracting, from the liquid phase of the reactor, a flow rate of reaction liquid equal to 1.6 times the flow rate of charge stock 1 being fed, i.e. with a direct extraction ratio (DER) of the extracted flow rate (9, 12 or 13)/flow rate (1) equal to 1.6, one obtains an increase of the output of 40%, corresponding to the conversion products present in the directly extracted reaction liquid. By operating with a value of the direct extraction ratio (DER) of 2.15, the overall output and consequently the processed charge stock double. By bringing the value of DER to 2.8, the overall output and the processed charge stock triple.

Advantages of the Invention

The use of the process with double extraction, described in the present invention, as a consequence of the high capacity of extraction of the products, allows further advantages in addition to that of the capacity. The selection of the reaction temperature, no longer conditioned by the need to increase the extraction of the conversion products via two-phase effluent, can be optimized also as a function of other aspects of the process, which are in any case important such as limiting the formation of coke and limiting the production of hydrocarbon gases during reaction. For these grounds, reaction conditions with low severity are preferred, in particular with limited reaction temperature, the latter having a reduced impact on the capacity of the reactor when the process described in the present invention is employed.

Analogous considerations hold true for another important parameter of the process: the spatial velocity of the hydrogen, or the gas containing hydrogen, sent to the base of the reactor. Since, with the double extraction process described herein, there is no need to ensure high gas flows to support the extraction of the products via two-phase effluent, the spatial velocity of the hydrogen can be drastically reduced with advantages both with regard to cost and regarding the capacity of the reactor, as a consequence of the reduction of the gas volume present during reaction, i.e. of the so-called gas holdup.

The additional extraction of conversion products further allows minimizing, as much as necessary, the maltene fraction at the reactor in order to ensure the necessary stability of the reaction means.

In the present description, not all of the possible structural and size alternatives to the specifically-described embodiments of the invention were illustrated: indeed, it did not seem necessary to expand upon the structural details of the plant of the invention, since no man skilled in the art, after the instructions given herein, will have difficulty in designing the most advantageous technical solution, selecting critical values, materials and size. These variants are nevertheless intended as equally comprised in the protective scope of the present patent, such alternative forms being per se easily derivable from the description made herein of the relation that ties each embodiment with the result that the invention wishes to obtain.

The invention claimed is:

1. A high output process for complete conversion of heavy liquid hydrocarbon charge stocks, in an upflow bubble column reactor, said process comprising the steps of:

feeding to the upflow bubble column reactor said hydrocarbon charge stock to be converted;

distributing, to a base of the upflow bubble column reactor, a flow of gas comprising hydrogen, said distributing to the base of the reactor of said gas flow comprising hydrogen ensuring remixing and uniformity of reaction liquid;

feeding a hydroconversion catalyst to the upflow bubble column reactor, the catalyst being uniformly dispersed in the charge stock to be converted;

creating a bubbling zone inside the upflow bubble column reactor due to an ascent, over an entire height of the reaction liquid present in the upflow bubble column reactor, of bubbles of said gas comprising hydrogen, said reaction liquid containing conversion products in liquid phase, including high-boiling conversion products, a mixture comprising said reaction liquid and said gas bubbles being present at the bubbling zone;

creating a two-phase flow being inside the upflow bubble column reactor by separation of said gas bubbles from said reaction liquid at an end of the bubbling zone towards a top of the upflow bubble column reactor, said two-phase flow comprising gaseous hydrogen, conversion products in gaseous phase and carryover of said reaction liquid containing conversion products in liquid phase, including the high-boiling conversion products;

extracting said two-phase flow from the top of the upflow bubble column reactor;

sending said two-phase flow to a phase separator in order to recover, at the head of the separator, said conversion products in gaseous phase and said gas comprising hydrogen, and in order to recover, at the bottom of the separator, a liquid phase comprising said high-boiling conversion products;

feeding said recovered gas comprising hydrogen to the upflow bubble column reactor;

drawing from the bubbling zone said mixture comprising said reaction liquid and said gas bubbles;

degassing said mixture at the operating pressure of the upflow bubble column reactor, said reaction liquid resulting from the degassing of the mixture;

subjecting to distillation, with final vacuum stage, said reaction liquid for the recovery of said high-boiling conversion products therefrom; and feeding to the upflow bubble column reactor a residue of said distillation with final vacuum stage, in order to complete the conversion thereof and maintain the liquid filling level of the reactor, wherein the process has an operating temperature between 380° C. and 440° C. and an operating pressure between 10 and 20 MPa.

2. The process according to claim 1, which sends to the upflow bubble column reactor said liquid phase recovered at the bottom of the separator.

3. The process according to claim 1, wherein the process unites said liquid phase recovered at the bottom of the separator with said reaction liquid resulting from the degassing of the mixture, for the subsequent distillation with final vacuum stage for the purpose of recovering said high-boiling conversion products.

4. The process according to claim 1, wherein a ratio between a flow rate of said reaction liquid extracted from the bubbling zone and a flow rate of said charge stock being fed is not less than 0.5.

5. The process according to claim 4, wherein the ratio between the flow rate of said reaction liquid extracted from the bubbling zone and the flow rate of said charge stock being fed is not less than 1.6.

6. The process according to claim 5, wherein the ratio between the flow rate of said reaction liquid extracted from the bubbling zone and the flow rate of said charge stock being fed is 2.8.

7. The process according to claim 1, wherein the process degasses the mixture simultaneously with the drawing of the same from the bubbling zone.

8. The process according to claim 7, wherein the process draws and simultaneously degasses said mixture by means of a frustoconical degasser-extractor positioned inside the reactor.

9. The process according to claim 8, wherein the process draws, from the bubbling zone, a flow rate of said reaction liquid not greater than 50 t/h per $m^2$ of inlet section of said degasser-extractor.

10. The process according to claim 9, wherein said flow rate of reaction liquid drawn from the bubbling zone is not greater than 23 t/h of inlet section of said degasser-extractor.

11. The process according to claim 1, wherein the process degasses said mixture in a tank outside the upflow bubble column reactor.

12. The process according to claim 11, wherein said tank is positioned at a height lower than that of the level of the interface of the bubbling zone, where said separation of said gas bubbles from said reaction liquid inside the upflow bubble column reactor occurs.

13. The process according to claim 12, wherein said tank is positioned at ground level.

14. The process according to claim 11, wherein the process feeds said tank, by means of separate inlets, respectively in the upper part with said two-phase flow and in the lower part with said mixture, said tank acting simultaneously as a separator for said two-phase flow and as a degasser for said mixture.

15. The process according to claim 14, wherein the process extracts a flow rate of said reaction liquid at the bottom of said degasser—separator tank not greater than 50 t/h per $m^2$ of horizontal section of said degasser—separator tank.

16. The process according to claim 15, wherein said flow rate of reaction liquid extracted from the bottom of said degasser—separator tank is not greater than 23 t/h per $m^2$ of horizontal section of said degasser—separator tank.

* * * * *